United States Patent
Schnorr (10) Patent No.: US 9,692,193 B1
(45) Date of Patent: Jun. 27, 2017

(54) CONNECTOR HAVING A PLATE SEAL AND A CONDUCTOR SEAL

(71) Applicant: GE AVIATION SYSTEMS, LLC, Grand Rapids, MI (US)

(72) Inventor: Kenneth Howard Schnorr, Pompano Beach, FL (US)

(73) Assignee: GE AVIATION SYSTEMS, LLC, Grand Rapids, MI (US)

( * ) Notice: Subject to any disclaimer, the term of this patent is extended or adjusted under 35 U.S.C. 154(b) by 0 days.

(21) Appl. No.: 15/222,082

(22) Filed: Jul. 28, 2016

(51) Int. Cl.
*H01R 12/00* (2006.01)
*H01R 25/00* (2006.01)
*H01R 13/52* (2006.01)
*H02G 3/22* (2006.01)
*H02G 3/08* (2006.01)

(52) U.S. Cl.
CPC ......... *H01R 25/006* (2013.01); *H01R 13/521* (2013.01); *H01R 13/5202* (2013.01); *H02G 3/083* (2013.01); *H02G 3/088* (2013.01); *H02G 3/22* (2013.01)

(58) Field of Classification Search
CPC .. H01R 13/52; H01R 13/5202; H01R 13/521; H01R 13/5219; H01R 13/5221
USPC .......................... 439/271, 278, 587, 272–275
See application file for complete search history.

(56) References Cited

U.S. PATENT DOCUMENTS

| | | | |
|---|---|---|---|
| 3,685,005 A * | 8/1972 | D'Alessandro | H01J 5/26 174/152 GM |
| 4,822,130 A | 4/1989 | Maranto et al. | |
| 5,406,453 A * | 4/1995 | Cusato | G06F 1/184 361/679.32 |
| 5,574,313 A | 11/1996 | McKleroy | |
| 5,650,911 A * | 7/1997 | Scholder | G06F 1/183 361/679.4 |
| 6,095,860 A * | 8/2000 | Gehrke | H01R 13/5208 439/274 |
| 6,532,154 B2 | 3/2003 | Eady et al. | |
| 6,709,274 B2 | 3/2004 | Lazaro, Jr. et al. | |
| 6,897,584 B2 | 5/2005 | Doherty et al. | |
| 6,991,478 B2 | 1/2006 | Girinon | |
| 9,153,912 B2 | 10/2015 | Boyden et al. | |
| 9,214,758 B2 * | 12/2015 | Matuschek | H01R 13/5202 |
| 2004/0029443 A1 * | 2/2004 | Quadir | H01B 17/306 439/587 |

(Continued)

*Primary Examiner* — Chandrika Prasad
(74) *Attorney, Agent, or Firm* — GE Global Patent Operation; William S. Munnerlyn (57) ABSTRACT

A sealed feedthrough connector can include a non-conductive clamp plate having at least one first conductor aperture and further including at least one conductor having a first end connecting to electronics in a high-power electronics chassis. The conductor can include a second end connecting to a circuit external to the electronics chassis, with a shoulder between the first and second ends. The connector can include a non-conductive terminal panel, a plate seal, and a conductor seal, the terminal panel having at least one second conductor aperture. The non-conductive clamp plate can be secured to the non-conductive terminal panel with a wall of the electronics chassis and the plate seal between them. At least one conductor can extend the first end through the first conductor aperture and the second end through the second conductor aperture, the conductor seal being positioned between the shoulder and the clamp plate or the terminal panel.

20 Claims, 6 Drawing Sheets

(56) References Cited

U.S. PATENT DOCUMENTS

2015/0288091 A1* 10/2015 Wang .................... H01R 31/06
439/587

* cited by examiner

CONNECTOR HAVING A PLATE SEAL AND A CONDUCTOR SEAL

BACKGROUND OF THE INVENTION

High-power electronics, such as voltage converters found on commercial aircraft, can experience operating temperatures as high as 150 degrees Celsius within a chassis mounting the high-power electronics. Currents as high as 1000 amperes can be generated by the high-power electronics for use by circuits external to and connected to the chassis. Such high currents are typically routed to the external circuits by way of a heavy bus bar protruding through an opening in a wall of the chassis with lug receptacles on the bus bar the connect cables going to the external circuits.

Environmental considerations often require a hermetic seal for some high power electronics such as a power converters. Known solutions for hermetically sealing electronic components do not account for the high currents and high temperatures associated with high-power electronics.

SUMMARY OF THE INVENTION

In one aspect, the present disclosure relates to a high-power sealed feedthrough connector assembly for a high-power electronics chassis. The connector assembly has a non-conductive clamp plate with one or more first conductor apertures. A conductor has a first end configured to connect to electronics in the high-power electronics chassis and a second end configured to connect to a circuit external to the high-power electronics chassis with a shoulder between the first and second ends. An exterior non-conductive terminal panel has one or more second conductor apertures. The connector assembly also includes a plate seal and a conductor seal. The non-conductive clamp plate is configured to be secured to the exterior non-conductive terminal panel with a wall of the high-power electronics chassis and the plate seal between them. The conductor first end extends through the first conductor aperture and the conductor second end extends through the second conductor aperture with the conductor seal between the shoulder and the non-conductive clamp plate or the exterior non-conductive terminal panel.

In another aspect, an electronics chassis has a wall and a feedthrough connector, and includes a non-conductive clamp plate on an interior of the wall of the electronics chassis having a first conductor aperture. A conductor extends through the first conductor aperture and the wall with a first end connected to electronics in the electronics chassis. An exterior non-conductive terminal panel on an exterior of the wall of the electronics chassis is secured to the clamp plate. A second end of the conductor extends through a second conductor aperture in the exterior non-conductive terminal panel. A plate seal is clamped between the wall of the chassis and the clamp plate or the terminal panel and a conductor seal is clamped between a shoulder of the one conductor and the clamp plate or the terminal panel.

DETAILED DESCRIPTION

As may be appreciated based on the disclosure, there exists a need in the art for a feedthrough connector that can hermetically seal a chassis containing high-power electronics while conducting very high currents to circuitry outside the chassis. Further, terminals of the connector may have to be insulated from a metal wall of the chassis and withstand rotational strain. Additionally, the high-power feedthrough connector may have to tolerate high heat generated within the chassis.

Figure 1A:
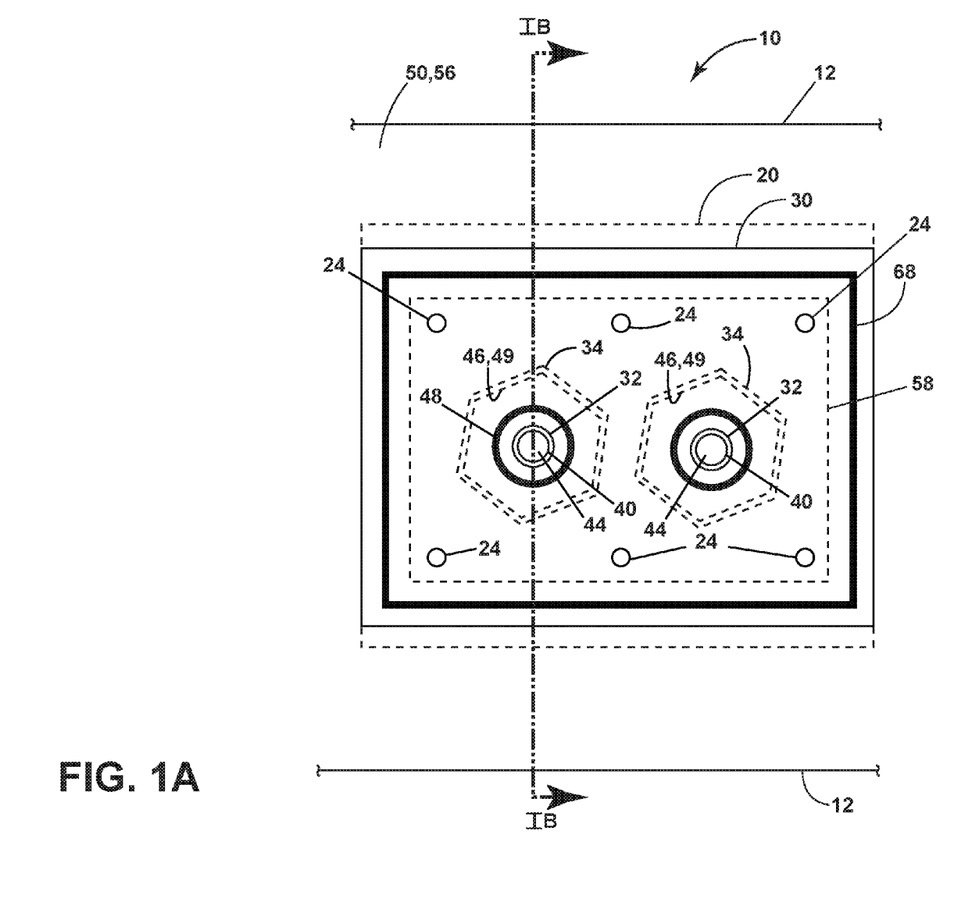
FIG. 1A illustrates a front view of a sealed feedthrough connector having two conductors, in accordance with various aspects described herein.
Figure 1B:
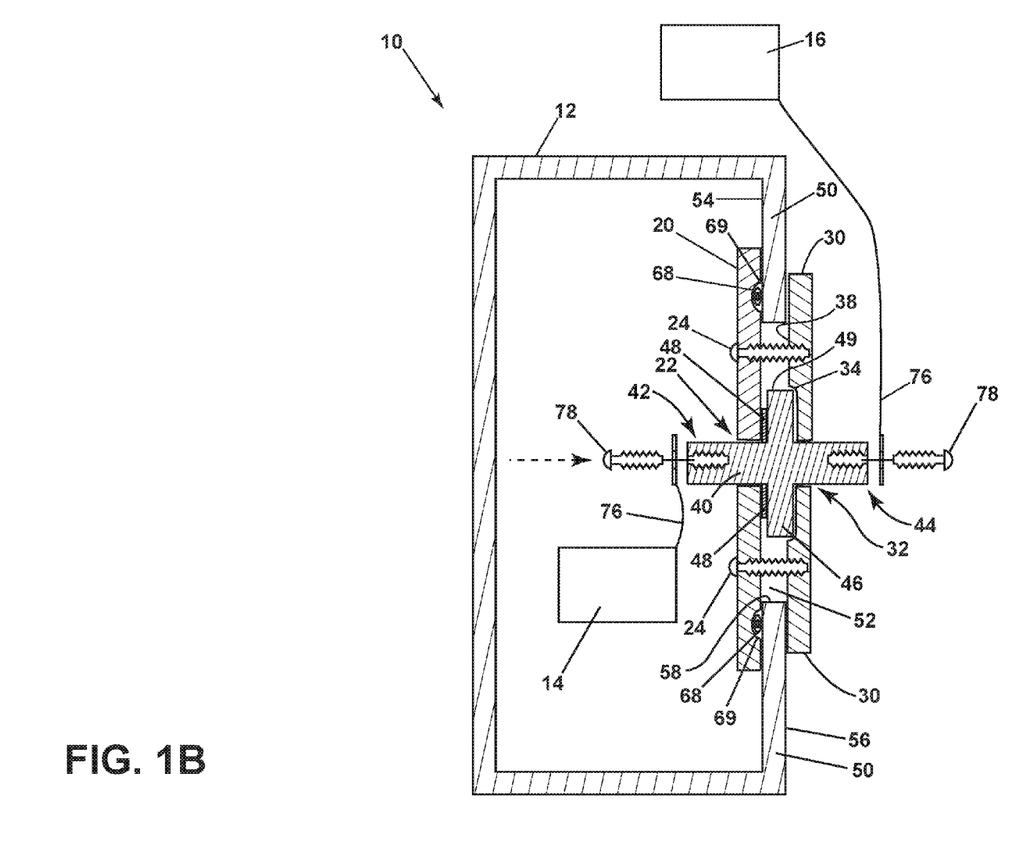
FIG. 1B illustrates a side sectional view of the connector in FIG. 1A, in accordance with various aspects described herein.

Referring to FIGS. 1A and 1B, in one aspect of the present disclosure, a high-power sealed feedthrough connector 10 for a high-power electronics chassis 12 can include a non-conductive clamp plate 20 having at least one first conductor aperture 22. In the present embodiment, the feedthrough connector 10 can have two conductors 40, each extending through a respective first conductor aperture 22. Each conductor 40 can have a first end 42 connecting to electronics 14 in the high-power electronics chassis 12 using a terminal lug and cable 76 and fastener 78. A shoulder 46 can be disposed between the first end 42 and the second end 44. An exterior non-conductive terminal panel 30 can have two second conductor apertures 32 and can be configured to be secured to the non-conductive clamp plate 20 with a wall 50 of the electronics chassis 12 between the terminal panel 30 and the clamp plate 20.

The second conductor aperture 32 can receive the second end 44 of conductor 40 extending through it and connecting to a circuit 16 external to the electronics chassis 12 using terminal lug and cable 76 and fastener 78. Clamp plate 20 can position conductors 40 within an opening 52 of the wall 50 by using clamp fasteners 24 to clamp wall 50. A wall-facing surface 38 of terminal panel 30 can frictionally clamp to an exterior surface 56 of the wall 50 under a clamping pressure of fasteners 24, and clamp plate 20 can frictionally clamp to an interior surface 54 of the wall 50 under the clamping pressure of fasteners 24. A dimension of the shoulder 46, such as a diameter, can be greater than a dimension of the second conductor aperture 32 and greater than a dimension of first conductor aperture 22 so that the shoulder 46 can be retained between the non-conductive clamp plate 20 and terminal panel 30 after clamping. The fastener 24 can be any suitable fastener including, but not limited to, a screw, a rivet, or a bolt and nut. Clamping may also include threaded inserts (not shown) installed in the terminal panel 30 or clamp plate 20 for receiving fasteners 24.

Continuing with FIG. 1, in various aspects, chassis 12 can be made of metal to manage the high heats generated by electronics 14, and the non-conductive clamp plate 20 and terminal panel 30 can insulate conductors 40 from a perimeter 58 of the wall 50. Connector assembly 10 can further include a plate seal 68 between the clamp plate 20 and the terminal panel 30 and against the wall 50 for hermetically sealing the electronics chassis 12. A plate groove 69 in the clamp plate 20 can seat the plate seal 68 and position the plate seal 68 against the interior surface 54 of the wall 50 and can provide a compression zone for allowing the wall 50 to be clamped flush against the clamp plate 20. Alternately, the plate seal 68 can be positioned between an exterior surface 56 of the wall 50 for hermetically sealing the electronics chassis 12, and the plate groove 69 can be located on the terminal panel 30. Plate seal 68 can be an O-ring, a flat washer, a layer of sealing material applied as a liquid prior to clamping, or any other suitable method for sealing under clamping pressure.

Connector assembly 10 can also include a conductor seal 48 positioned between the shoulder 46 and the clamp plate 20 for preventing liquid or gas from passing through the first conductor aperture 22. The conductor seal 48 can also be positioned between the shoulder 46 and the terminal panel 30 for preventing liquid or gas from passing through the second conductor aperture 32. Conductor seal 48 can be an O-ring, a flat washer, a layer of sealing material applied as a liquid prior to clamping, or any other suitable method for sealing under clamping pressure. The plate seal 68 and the conductor seal 48 can be formed from a suitable material including, but not limited to, rubber, polymer, nitrile or neoprene. Generally, the plate seal 68 and the conductor seal 48 can be on the same side of the wall 50 for sealing the electronics chassis 12 since there are two parallel openings to fluid or gas in the present embodiment.

Referring still to FIGS. 1A and 1B, in various aspects, a shoulder recess 34 can be included in the terminal panel 30 for receiving the shoulder 46, and a perimeter 49 of the shoulder can be keyed to the shoulder recess 34 for preventing rotation of the conductor 40. For example, the perimeter 49 of the shoulder 46 can be shaped as a hexagon as shown, or can be shaped as a rectangle or a square to rotationally lock the shoulder 46 to the terminal plate 30. Beneficially, the locking feature of the shoulder can make the first end 42 and the second end 44 of the conductor receptive of a lug 76 attachment where torque is applied to the conductor 40 without a risk of damage to the conductor seal 48, an improvement over the prior art. Compared to a glass-filled connector with pins passing through the glass, the separate mounting, insulating, and sealing elements of the present disclosure permit an improved choice and configuration of materials, which can prevent damage to both the insulating and the sealing elements of feedthrough connector 10. Alternatively, the shoulder recess 34 can be disposed in the clamp plate 20 where the perimeter 49 is keyed to the shoulder recess 34 for preventing rotation of the conductor 40.

The clamping process can be arranged such that the fasteners 24 first draw the clamp plate 20 and the shoulder 46 toward the terminal panel 30, compressing the conductor seal 48 and the plate seal 68. Once a desired compression of the seals 48 and 68 has been achieved, the clamp plate can be flush against the wall 50 for frictionally securing the connector assembly 10 to the wall 50. Shoulder 46 can be dimensioned such that it does not impede the clamping to the wall 50.

Alternately, in other aspects, positioning ribs or detents can be disposed on one or both surfaces of the wall for interlocking the wall with complementary grooves or pins on the clamp plate or the terminal panel, where the ribs or detents do not fully seat against their complementary grooves or pins once the fasteners have adequately compressed the seals. In this way, contact between the wall and the clamp plate, and between the wall and the terminal panel, can be diverted primarily to compressing seals 48 and 68 for better control of the sealing action while firmly attaching the connector assembly 10 to the chassis 12. For example, a constant-pressure fastener (not shown) can be configured to maintain a constant pressure on seals 48 and 68 as temperature varies in the wall 50 or the chassis 12, thereby creating a more consistent seal pressure than would occur if the wall 50 were flush against the clamp plate 20 and the terminal panel 30. Alternatively, the shoulder 46 can be dimensioned thick enough such that it stops the clamping action caused by the fasteners 24, thereby preventing any looseness in a position of the conductor 40 in its clamped state.

The clamp plate 20 and the terminal panel 30 can be formed from a suitable non-conductive material offering rigidity including, but not limited to, ABS (acrylonitrile, butadiene, and styrene), fiberglass, fiber-reinforced plastic, and carbon fiber. Conductor 40 can be a round or polygonal bolt or rod of metal offering low electrical resistance to large current flow. The metal material may include but is not limited to copper, steel, brass or aluminum and can include anti-corrosive treatments or conductive plating such as gold plating. A diameter (not shown) of the conductor can have an American Wire Gauge (AWG) of 00 or 0.365", or the diameter can be greater than 0.5 inches for supporting up to several hundred amperes of current or more. The diameter can also be less than 0.5 inches for passing smaller currents. The connector assembly 10 can have any number of conductors 40 from one conductor to more than two conductors, and can be arrange in one or more rows or any non-row configuration providing adequate access to the first end 42 and second end 44 for attaching circuit 16 and electronics 14.

Figure 2:
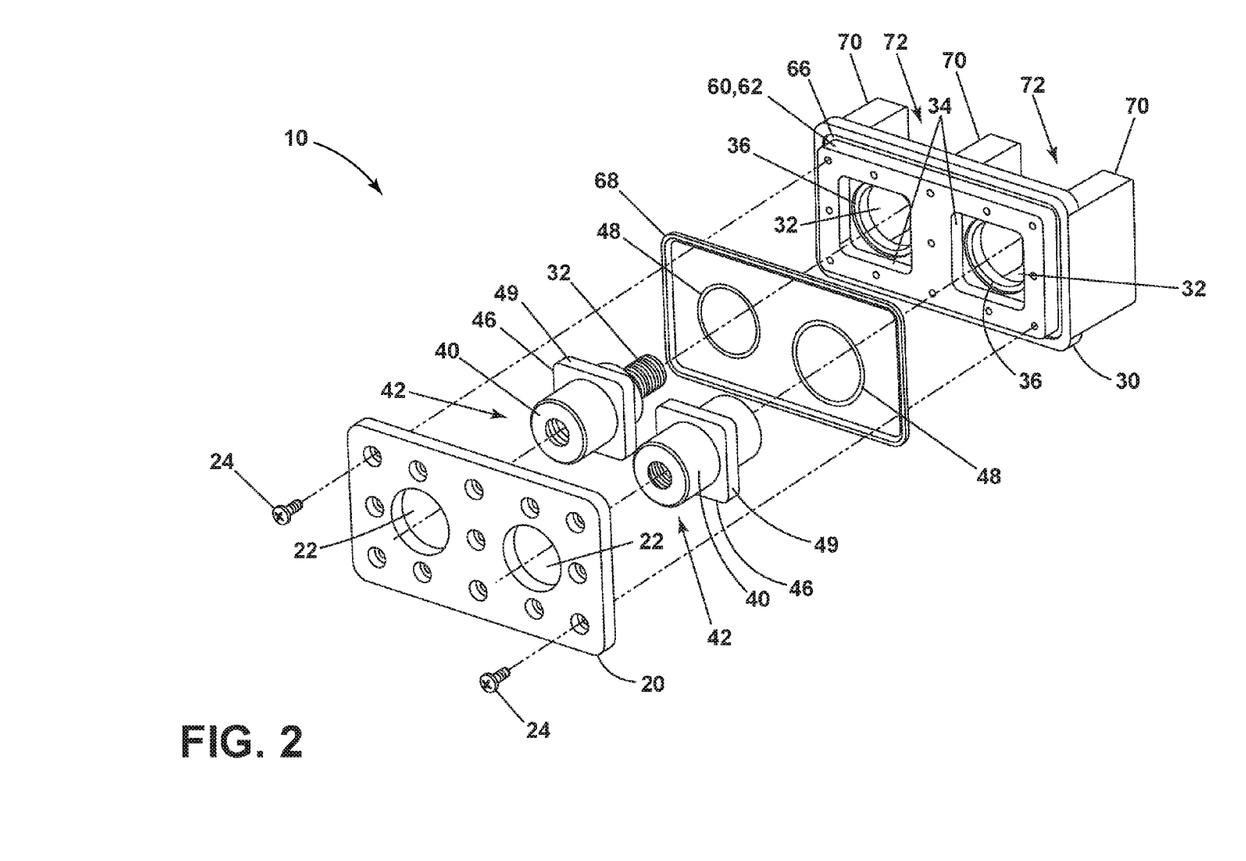
FIG. 2 illustrates an isometric view of an exploded 2-conductor sealed feedthrough connector with a boss and a shoulder recess, in accordance with various aspects described herein.

Referring now to FIG. 2, in another aspect, a two-conductor connector assembly 10 is shown in an exploded view from an inside of the electronics chassis 12 and without the chassis wall 50 where a terminal panel 30 can include a boss 60 shaped complementary to and projecting into a perimeter 58 (FIG. 3) of the wall of the chassis 12. The boss 60 can align the connector assembly 10 to the chassis 12 containing high-power electronics (not shown) and be configured with a close fit such that a plate seal 68 clamped between the terminal panel 30 and the wall forms a hermetic seal between them. The boss 60 provides an insulating barrier between conductors 40 and the wall. Plate seal 68 may be a rectangular O-ring positioned around a perimeter 62 of the boss 60. Conductors 40 with first end 42 configured with internal threads can have a shoulder 46 for retaining the conductor 40 when the connector 10 is clamped together. A boss groove 66 can be disposed on a wall-facing surface 38 of terminal panel 30 adjacent the boss and can seat and position the plate seal 68 against the wall for sealing the wall. Boss groove 66 can be a semi-circular indentation in a corner between the perimeter 62 and the wall-facing surface 38 of the boss 60. Boss groove 66 can alternatively be any shape complementary to a cross-sectional shape of plate seal 68.

The connector assembly of FIG. 2 can also include a shoulder recess 34 in the boss 60 receivable of the shoulder 46, where a perimeter 49 of the shoulder 46 can be keyed to the shoulder recess 34 for preventing rotation of the conductor 40. In the present aspect, the perimeter 49 can be shaped as a square, but could also be shaped as a rectangle, hexagon, or other non-circular shape. An aperture groove 36 can be disposed on a wall-facing surface 38 of the terminal panel 30 adjacent a second conductor aperture 32 for positioning a conductor seal 48 against the shoulder 46. Aperture groove 36 can be shaped to complement the conductor seal 48 and can be shaped as a semicircle to seat conductor seal 48 when the conductor seal 48 is an O-ring. Alternately, the aperture groove 36 can be positioned away from the second conductor aperture 32 and still on the wall-facing surface 38 and adjacent to the second conductor aperture 32.

In another aspect of the present disclosure, the connector assembly 10 can include, when there are at least two second conductor apertures 32, and a non-conductive partition 70 extending from the terminal panel 30 away from the chassis and between two of the second conductor apertures 32 thereby creating a dedicated volume of space 72 around the second end 44. The volume of space 72 can provide sufficient clearance for the terminal lug and the cable 76 (FIG. 3) while protecting adjacent second ends 44 from shorting. Partition 70 can be a flat wall extending vertically along the terminal panel 30 and can be molded as part of the terminal panel 30 or attached as a separate flat wall. Partition 70 can also extend from the terminal panel 30 on an outside of a row of the second conductor apertures 32 with no second conductor aperture 32 on the other side of that partition 70. Or partition 70 can be disposed on either side of one second conductor aperture 32 in the case of a one-conductor connector assembly 10.

Figure 3:
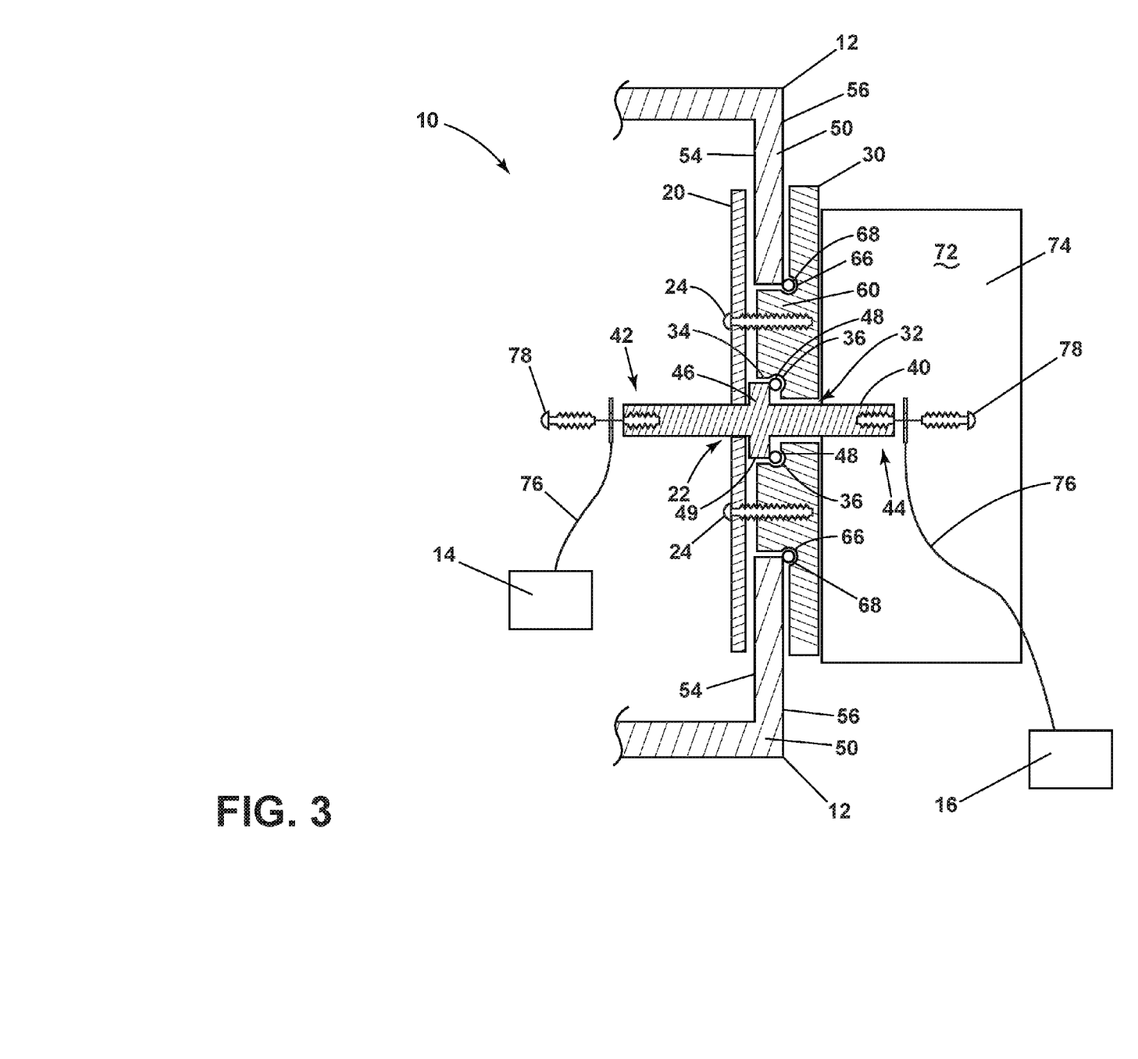
FIG. 3 illustrates a side sectional view of the feedthrough connector of FIG. 2, in accordance with various aspects described herein.

FIG. 3 illustrates a side-sectional view of the exploded connector of FIG. 2 for better illustration of the wall 50 of the chassis 12, the clamping process, and the seals 48 and 68. The connector assembly 10 is shown in a process of being clamped around the wall 50 with a gap between wall 50 and the clamp plate 20 and a pressure being exerted against the shoulder 46. Volume of space 72 can occupy a region around the second end 44 and a region bordered by the partition 70. Plate seal 68 can lie in a boss groove 66 disposed in a corner between boss 66 and wall-facing surface 38, or boss groove 66 can be disposed further out (not shown) from the conductor 40 on the wall-facing surface 38. Boss groove 66 may provide a compression zone for allowing the wall 50 to be clamped flush against the terminal panel 30. Likewise, the conductor seal 48 can lie directly adjacent to the second conductor aperture 32 in the aperture groove 36, or can lie further away from the conductor 40 in the aperture groove 36 on the wall-facing surface 38.

Figure 4:
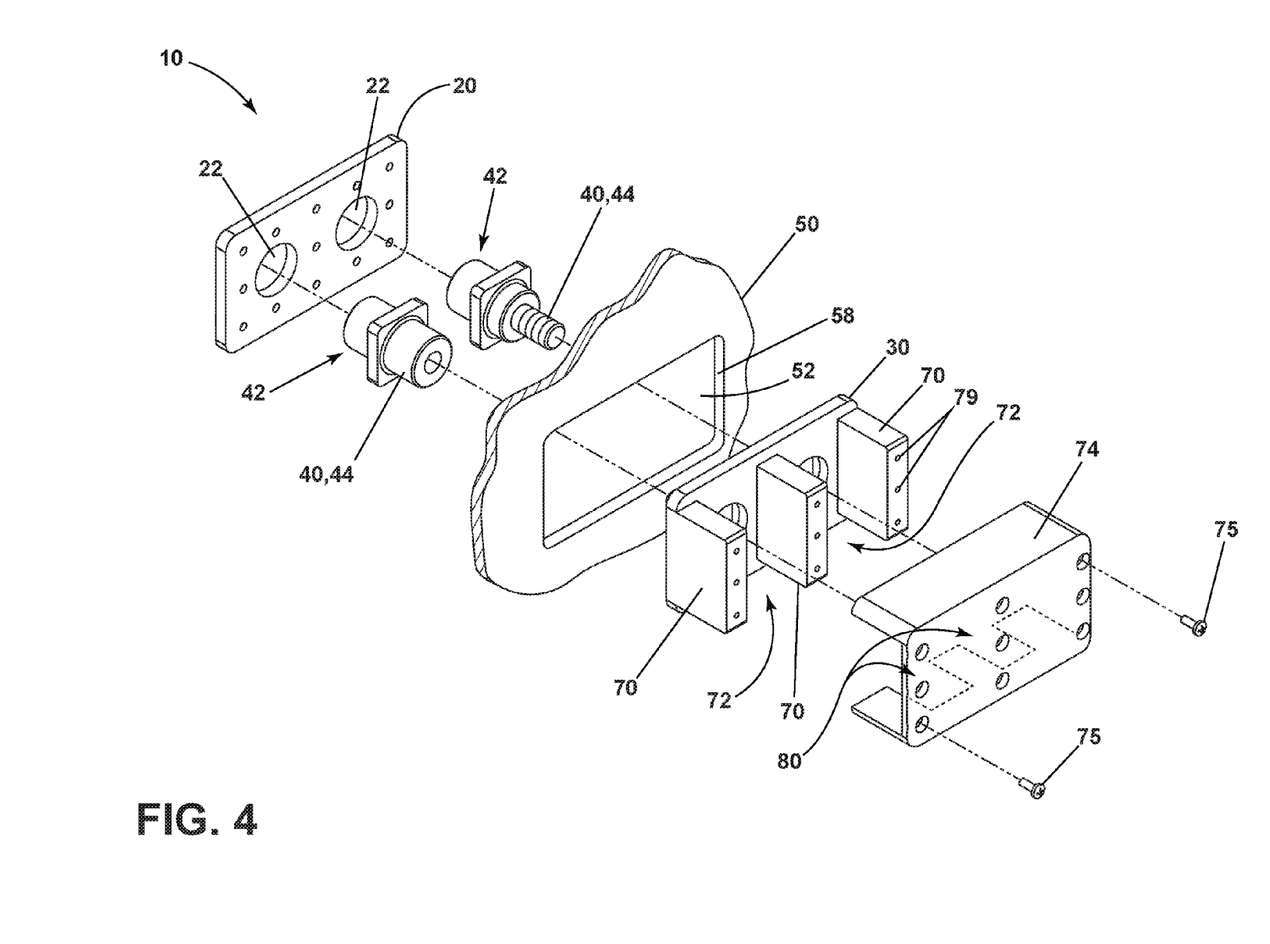
FIG. 4 illustrates an isometric view of the connector of FIG. 2 seen from outside the chassis wall, in accordance with various aspects described herein.

FIG. 4 illustrates the connector assembly 10 of FIG. 2 mounting to the wall 50 of the electronics chassis 12 as seen from the outside of the chassis 12. Opening 52 in the wall 50 is receivable of the boss (not visible) of terminal panel 30. A shroud 74 can fasten to the terminal panel 30 and can house the partitions 70 and the volume of space 72 around second end 44. Partition 70 can contain one or more threaded inserts 79 for receiving a shroud fastener 75 fastening the shroud 74 to the terminal panel 30. Shroud 74 may also clip onto the terminal panel 30 using a snap or detent or any other technique known in the art. An inner surface (not shown) of the shroud 74 can touch or mate with a top or bottom edge (not shown) partition 70 along at least one edge of partition 70 sufficient to isolate two adjacent second ends 44 from each other, and can be made from the same insulating material as the terminal panel. An access opening 80 can be provided along one or more sides of the shroud 74 for routing lug and cable 76 (not shown).

Figure 5:
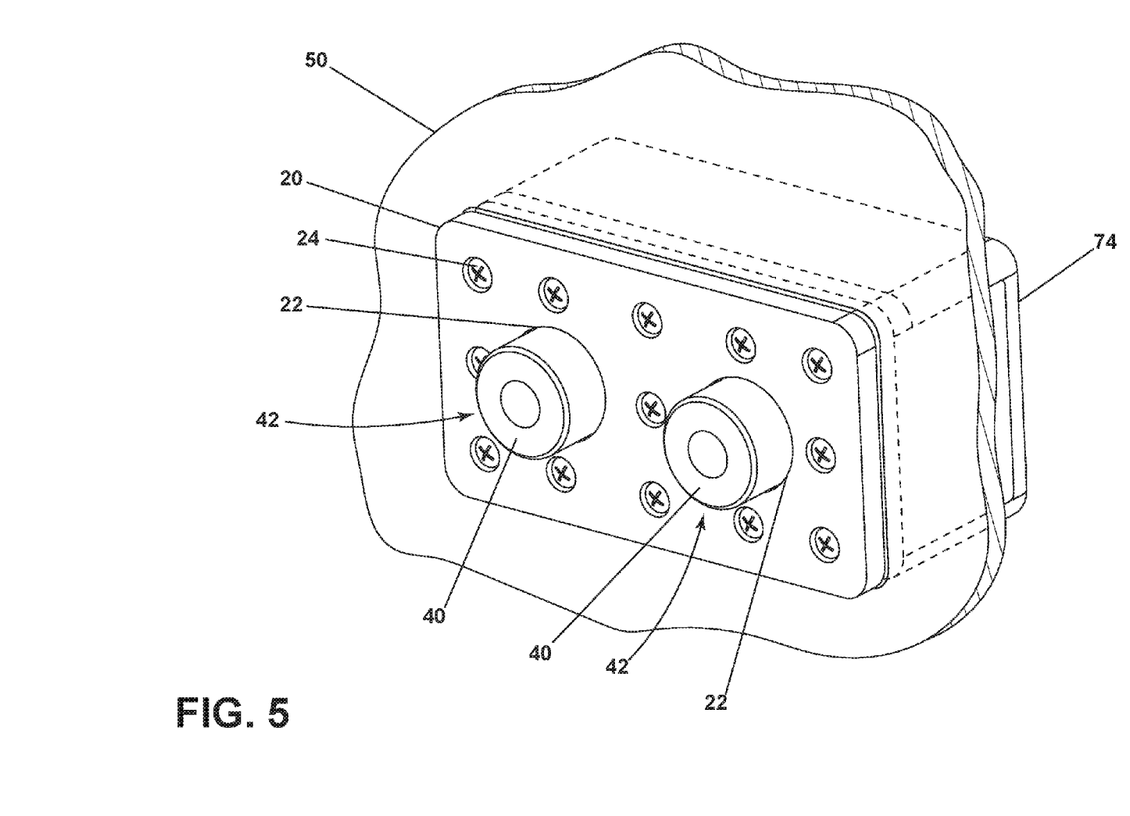
FIG. 5 illustrates an isometric view of an assembled 2-conductor connector of FIG. 2 seen from the inside of the chassis wall, in accordance with various aspects described herein.

FIG. 5 illustrates the feedthrough connector 10 clamped around the wall 50 and as seen from the inside of chassis 12. There can be two or more fasteners 24 clamping the clamp plate 20 to terminal panel 30 while insulatively passing conductors 40 through an opening in wall 50. The conductor seal (hidden) and the plate seal (hidden) can hermetically seal the inside of the electronics chassis 12 at the first conductor apertures 22 and the opening in wall 50, respectively. First end 42 can have threads on the inside or the outside of conductor 40. Shroud 74 can enclose second ends 44 of conductor 40. Alternatively, first end 42 can be connectorized with a sliding, bayonet, or other mating pair, or can connect to electronics in the chassis using a clamp arrangement such as a hose clamp.

Many other possible embodiments and configurations in addition to those shown in the above figures are contemplated by the present disclosure. To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" or "a plurality of" various elements have been described, it will be understood that "a set" or "a plurality" can include any number of the respective elements, including only one element. Combinations or permutations of features described herein are covered by this disclosure.

This written description uses examples to disclose embodiments of the disclosure, including the best mode, and also to enable any person skilled in the art to practice embodiments of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A high-power sealed feedthrough connector assembly for a high-power electronics chassis, the connector assembly comprising:
   a non-conductive clamp plate having at least one first conductor aperture;
   at least one conductor having a first end configured to connect to electronics in the high-power electronics chassis, a second end configured to connect to a circuit external to the high-power electronics chassis, and a shoulder between the first and second ends;
   an exterior non-conductive terminal panel having at least one second conductor aperture;
   a plate seal; and
   a conductor seal,
   wherein the non-conductive clamp plate is configured to be secured to the exterior non-conductive terminal panel with a wall of the high-power electronics chassis and the plate seal between them, and the at least one conductor having the first end extending through the at least one first conductor aperture and the second end extending through the at least one second conductor aperture with the conductor seal between the shoulder and the non-conductive clamp plate or the exterior non-conductive terminal panel.

2. The connector assembly of claim 1 further comprising a shoulder recess in one of the clamp plate or the terminal panel and receivable of the shoulder, a perimeter of the shoulder being keyed to the shoulder recess for preventing rotation of the conductor.

3. The connector assembly of claim 2 wherein the perimeter of the shoulder is a rectangle.

4. The connector assembly of claim 1 further comprising a boss projecting from the terminal panel and shaped complimentary to an opening in the wall receivable of the boss.

5. The connector assembly of claim 4 wherein the plate seal is an O-ring positionable around the boss.

6. The connector assembly of claim 4 further comprising a boss groove disposed on a wall-facing surface of the terminal panel adjacent the boss, the boss groove for positioning the plate seal against the wall.

7. The connector assembly of claim 4 further comprising a shoulder recess in the boss and receivable of the shoulder, a perimeter of the shoulder being keyed to the shoulder recess for preventing rotation of the conductor.

8. The connector assembly of claim 7 wherein the perimeter of the shoulder is a rectangle.

9. The connector assembly of claim 1 wherein the conductor seal is an O-ring.

10. The connector assembly of claim 9 further comprising an aperture groove disposed on a wall-facing surface of the terminal panel adjacent the second conductor aperture, the aperture groove for positioning the conductor seal against the shoulder.

11. The connector assembly of claim 1 further comprising, when there are at least two of the at least one second conductor aperture, a non-conductive partition extending from the terminal panel between two of the at least two second conductor apertures and operable to dedicate a volume of space around the second end.

12. The connector assembly of claim 11 further comprising a shroud fastenable to the terminal panel and configured to house the partition and the volume of space.

13. An electronics chassis having a wall and a feedthrough connector comprising:
a non-conductive clamp plate on an interior of the wall of the electronics chassis and having a first conductor aperture;
at least one conductor extending through the first conductor aperture and the wall and having a first end connected to electronics in the electronics chassis;
an exterior non-conductive terminal panel on an exterior of the wall of the electronics chassis and secured to the clamp plate and having at least one second conductor aperture with a second end of the at least one conductor extending through the at least one second conductor aperture; and
wherein a plate seal is clamped between the wall of the chassis and the clamp plate or the terminal panel, and wherein a conductor seal is clamped between a shoulder of the at least one conductor and the clamp plate or the terminal panel.

14. The feedthrough connector of claim 13 further comprising a boss projecting from the terminal panel and shaped complimentary to an opening in the wall receivable of the boss.

15. The feedthrough connector of claim 14 wherein the plate seal is an O-ring around the boss.

16. The feedthrough connector of claim 14 further comprising a boss groove disposed on a wall-facing surface of the terminal panel adjacent the boss and positioning the plate seal against the wall.

17. The feedthrough connector of claim 14 further comprising a shoulder recess in the boss and receiving the shoulder, the shoulder keyed to the shoulder recess to prevent rotation of the conductor.

18. The feedthrough connector of claim 17 wherein the shoulder and the shoulder recess key to each other at a rectangular perimeter of the shoulder.

19. The feedthrough connector of claim 13 further comprising an aperture groove disposed on a wall-facing surface of the terminal panel adjacent the second conductor aperture and positioning the conductor seal against the shoulder.

20. The feedthrough connector of claim 13 further comprising, when there are at least two of the at least one second conductor aperture, a non-conductive partition extending from the terminal panel between two of the at least two second conductor apertures and operable to dedicate a volume of space around the second end.

* * * * *